Jan. 1, 1935.   J. A. GLICK   1,986,144
HEAVY DUTY BRAKE BLOCK
Filed Aug. 15, 1932
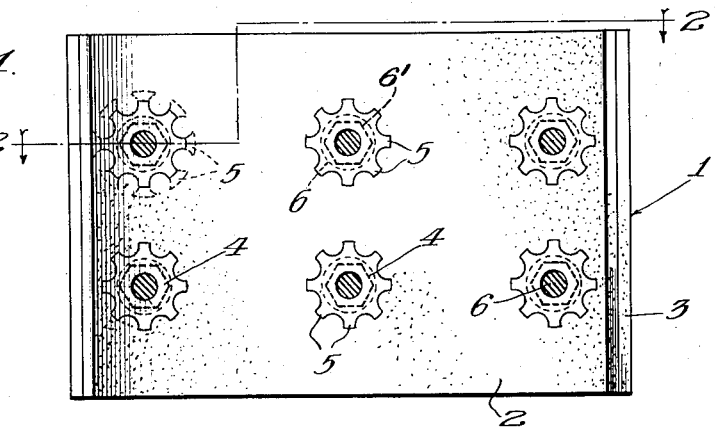
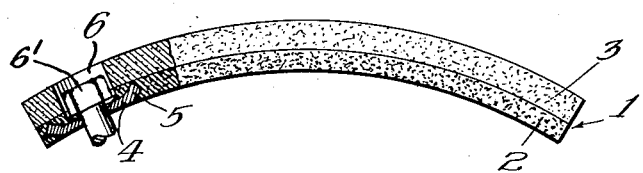
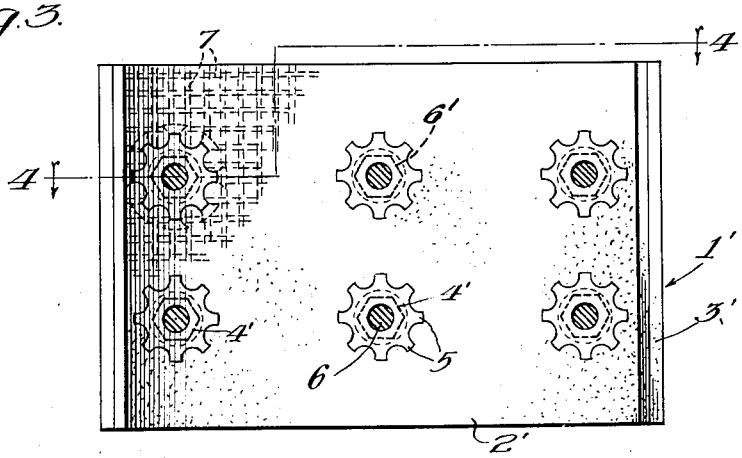
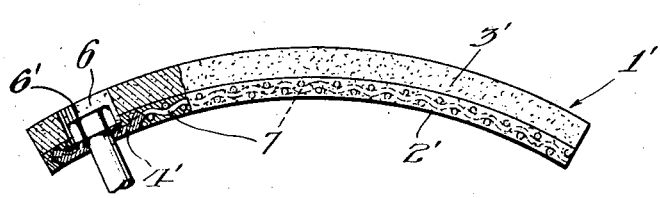
Inventor:
John A. Glick,
By Frank S. Belknap
Attorney.

Patented Jan. 1, 1935

1,986,144

UNITED STATES PATENT OFFICE 1,986,144

HEAVY DUTY BRAKE BLOCK

John A. Glick, Milford, Conn., assignor to Raybestos-Manhattan, Inc., Bridgeport, Conn., a corporation of New Jersey Application August 15, 1932, Serial No. 628,787

4 Claims. (Cl. 188—234)

This invention relates to improvements in brake blocks and refers specifically to the provision of means whereby brake blocks may be secured or anchored by means of bolts or the like without subjecting the material comprising the block to the shearing action or disrupting force of the bolts upon the material comprising the block when the block is subjected to braking stresses.

The utility, object and advantages of my invention will be apparent from the accompanying drawing and following detail description.

In the drawing, Fig. 1 is a top plan view of a brake block, illustrating a metallic washer embedded in the concave surface thereof.

Fig. 2 is a sectional view taken on the line 2—2 of Fig. 1.

Fig. 3 is a view similar to Fig. 1 illustrating a slightly modified form of my invention.

Fig. 4 is a sectional view taken on the line 4—4 of Fig. 3.

Referring in detail to the drawing, 1 indicates a brake block of the moulded type adaptable for use in conjunction with internal expanding brakes. Of course, the type of brake, whether internal expanding or external contracting forms no part of my invention and, hence, I do not wish to be limited to the precise type shown. The brake block is preferably, but not necessarily, of composite structure, that is, the same may comprise a non-metallic back 2 of relatively tough material, strong in compression and shearing, such as the usual rubber-sulphur-fiber mix well known in the art, and a facing material 3 having a satisfactory coefficient of friction.

Heretofore, such blocks have been anchored or secured to the brake shoes, not shown, by passing bolts 6' through spaced apertures provided in the block. However, where brake blocks for automotive vehicles are subjected to severe use, it has been the experience of the industry that such blocks, when held down by bolts, tend to shift position slightly under braking stress due to the fact that the non-metallic back is slightly compressible and bolts cannot be tightened down upon it so as to absorb all this compression even where the residual compressibility is of the order of a few thousandths of an inch. Stresses occur of sufficient magnitude in very severe cases so that the bolt head moves over the surface of the non-metallic composition and the block thereby becomes loose. After such repeated backward and forward motion, wear takes place under the bolt and the entire block loosens causing strains due to shock, eventually resulting in squeaking of the brakes and cracking or shearing of the block.

To eliminate this objectionable action I may mold into the strong non-metallic back 2, if a composite block is used or into the material comprising the block proper if no backing substance is used, a metal washer 4 having outwardly extending inwardly turned tangs or teeth 5 so as to provide a permanent lock at the back of the block, at spaced intervals registering with the bolt holes 6. The bolt head may be tightened down solidly upon the material without weakening the backing material and because of the area of contact between the washers 4 and the back 2, relative motion between the block and the brake shoe, due to braking stresses, is substantially eliminated.

The washers 4 are preferably independently disposed with respect to each other so that stresses or possible movement of one washer will not be transmitted or bear upon the remaining washers. If the usual rubber-sulphur-fiber mix is used as a backing material 2, the washers 4 are preferably constructed of brass, copper or copper plated steel or copper plated iron, since a much better bond with the rubber-sulphur-fiber compound is obtained than if, for example, steel alone were used.

Referring particularly to Figs. 3 and 4, a slightly modified form of my invention is shown wherein 1' indicates a brake block similar in construction to the block 1. The block 1' may be provided with a backing compound 2' having characteristics similar to the back 2 and a convex surface of friction material 3' similar to the material 3.

As a feature of this form of my invention I may embed, during the manufacture of the block, a reinforcing medium such as a wire mesh 7 in the backing material 2'. Washers 4' may be positioned within the backing material 2' in a manner similar to the positioning of washers 4 in the backing material 2, and said washers may be of similar construction to the washers 4.

By the provision of the reinforcing wire mesh 7, the washers 4' are not structurally interconnected by the mesh 7 but are independent of each other, the wire mesh being provided merely to reinforce the backing material 2'.

I am aware that many modifications of my invention may suggest themselves to any one skilled in the art which will not depart from the spirit of my invention. Hence, I do not wish to be limited to the specific structure as shown and described inasmuch as my invention broadly contemplates a metal to metal contact between the bolt head, bolt retainer and brake shoe when the block is in assembled position and to the positive locking with the non-metallic composition of the block of the bolt retainer, the bolt retainer being so spaced as to provide individual support for each bolt used in attaching the block to the brake shoe.

I claim as my invention:

1. A brake block comprising in combination, a segment of non-metallic moulded brake material having a back of relatively strong moulded non-metallic material coextensive in area with the area of the back of the block, said segment being provided with a plurality of spaced apertures, a star-shaped metal washer having laterally extending tangs embedded in said back adjacent each aperture whereby the shanks of bolts passed through said apertures make contact with said washers.

2. A brake block comprising in combination, a segment of moulded non-metallic material provided with a plurality of spaced apertures which extend through the entire thickness of the block, a reinforcing medium moulded in one surface of said segment, a metallic washer having a plurality of outwardly extending inwardly turned tangs moulded in said surface adjacent each aperture whereby the shanks of bolts passed through said apertures make contact with said washers, said washers being unconnected by said reinforcing medium.

3. A brake block comprising in combination, a segment of non-metallic moulded friction material and a back of relatively strong non-metallic moulded backing material coextensive in area with the area of the back of the block, said friction material and backing material comprising said segment being provided with spaced apertures, a reinforcing wire mesh embedded in said backing material, and a star-shaped washer embedded in said backing material adjacent each of said apertures whereby the shanks of bolts passed through said apertures make contact with said washers, said washers being unconnected by said reinforcing wire mesh whereby stresses upon one washer are not transmitted to the remaining washers.

4. A brake block comprising in combination, a segment of non-metallic moulded friction material and a back of relatively strong, non-metallic moulded backing material, said friction material and backing material comprising said segment being provided with spaced apertures, a reinforcing wire mesh embedded in said backing material and a washer embedded in said backing material adjacent each of said apertures whereby the shanks of bolts passed through said apertures make contact with said washers, said washers being unconnected by said reinforcing wire mesh whereby stresses acting upon one washer are not transmitted to the remaining washers.

JOHN A. GLICK.